United States Patent

[11] 3,620,558

| [72] | Inventor | Daniel G. MacMillan<br>Route No. 1 Box 856, Winter Haven, Fla. 33880 |
|---|---|---|
| [21] | Appl. No. | 835,439 |
| [22] | Filed | June 23, 1969 |
| [45] | Patented | Nov. 16, 1971 |

[54] JOINT LOCKING APPARATUS
13 Claims, 10 Drawing Figs.

| [52] | U.S. Cl. | 287/54, 287/124 |
|---|---|---|
| [51] | Int. Cl. | F16b 7/00 |
| [50] | Field of Search | 287/124, 2, 54 A, 54 B, 54 C, 189.36 H |

[56] References Cited

UNITED STATES PATENTS

| 2,604,342 | 7/1952 | Holmes | 287/54 C UX |
| 2,911,243 | 11/1959 | Micozzi | 287/54 A |
| 2,952,484 | 9/1960 | Zoltok | 287/54 C |
| 3,008,741 | 11/1961 | MacCormack | 287/54 B |

FOREIGN PATENTS

| 1,105,596 | 4/1961 | Germany | 287/189.36 H |
| 1,460,477 | 10/1966 | France | 287/189.36 H |
| 551,720 | 6/1932 | Germany | 287/2 |
| 553,147 | 5/1943 | Great Britain | 287/2 |
| 932,876 | 9/1955 | Germany | 287/54 C |
| 1,349,424 | 12/1963 | France | 287/2 |
| 438,848 | 12/1967 | Switzerland | 287/54 A |

*Primary Examiner*—Andrew V. Kundrat
*Attorney*—Duckworth and Hobby

ABSTRACT: A joint locking device for use in the construction of knockdown furniture, display cases, and the like, where a structure is to be readily assembled to a predetermined configuration and then readily collapsed for transportation or reassembly. One member of a structural frame has a locking insert for insertion into a second member of the frame whereby the two members may be locked together in a rigid manner. The locking insert has a base member with a guide groove therein and a pair of sliding locking members having slide bars for sliding in the guides in the base. The locking members may be forced apart for gripping the internal walls of the second frame member, thereby locking the two frame members together. The sliding lock members are forced apart by a setscrew with access to the setscrew provided by a small aperture in the side of the frame member.

PATENTED NOV 16 1971

DANIEL G. MACMILLAN
INVENTOR.

BY Duckworth & Hobby
Attorneys

PATENTED NOV 16 1971 3,620,558

DANIEL G. MACMILLAN
INVENTOR.

BY Duckworth & Hobby
Attorneys

3,620,558

JOINT LOCKING APPARATUS

BACKGROUND OF THE INVENTION

A number of simple, but fundamental, marketing principles unlie the invention. The first and perhaps the most important of these is the ever-present necessity of cutting distribution costs by conserving space in storage, in transit and in retail display areas, by minimizing handling and warehousing, and by holding retail inventories to the lowest possible levels. This principle applies with particular force to the manufacture, transportation and distribution of furniture and other similar articles. Secondly, the desirability of providing maximum flexibility in style and design, in size and configuration, and in the use of materials and finishes is also of major importance to the modular construction frame or system as described above. Finally, the case of assembly and disassembly tends to maximize the collapsibility and hence the portability of articles constructed with the said modular frame or system, including not only furniture, store fixtures, counters, display cases and the like, but also heavy-duty work benches, assembly benches, scaffolding and other industrial applications.

At the manufacturing level the basis principles which govern the mechanics and fabrication of the modular construction frame require only, but not necessarily inclusively, that machined or finished castings, stampings and other components, such as precut tubes of standard I.D. and O.D. dimensions, table tops, shelves, side panels and packaging materials be assembled and inventoried in one location preparatory to packing and shipping in accordance with the customer's or ultimate user's requirements. Thus articles to be constructed of such components, which together constitute the modular construction frame, can in general be virtually custom-made to the customer's or user's specific needs and desires.

With specific reference to retail outlets which offer furniture and other similar products for use in home or office, or in hotels, motels and the like, the retailer can sell either from assembled floor models or from scale models. And because of the modular construction fram's pronounced flexibility, including not only precut and drilled tubes of varying lengths, but also table or cabinet tops, shelves and side panels which in many cases are either reversible or interchangeable or both, the retailer can hold his floor inventory, whether it consists of full-size units or scale models, to a minimum. Hence with the customer's order in hand, he can ship from prepackaged, space-saving shelf stocks rather than from large, open warehouse stocks.

A principal feature of the modular construction frame, moreover, is the simple, and hence almost classical, appearance of articles constructed therefrom, especially such articles as furniture and the like. This is because the integrated joint locking assembly is perfectly flush with the outer surfaces of the frame members which it locks together and is generally of the same texture and finish as that of such frame members. The apertures for locking and unlocking the frame members are positioned on inside corners of the frame members and hence are either invisible or almost totally inconspicuous to the casual observer of the resulting framework.

SUMMARY OF THE INVENTION

It is the principal object of this invention to provide a modular construction frame or system which is particularly useful in the construction of readily assembleable and collapsible articles or products. A principal feature of such frame or system or modular construction is a joint locking assembly, to be positioned at a corner of said frame or structure at an intersection of tube members forming said frame, and this invention is directed towards this joint locking assembly. Accordingly, a lock joint fitting for connecting a plurality of frame or structural members together is provided in which one structural member having an opening in one or both ends thereof may be attached to a second structural member which second structural member may be no more than a locking joint or may be another part of the frame, or the like, having one or more locking members forming a part thereof. The frame member having the openings in one or both ends is adapted to receive one of said locking inserts for locking the two structural members together. The locking insert has a base member which is provided with a track or guide for slide bars of a pair of locking members which are adapted to slide back and forth in the guide of the base. A screw threaded through one of the locking members will separate the two locking members when the screw is tightened, thus causing the locking members to engage the internal walls of frame member in which the locking insert has been inserted. Access to the screw for separating the locking members is provided by a small aperture in the side of the structural member receiving the locking insert.

The present invention also provides for special gripping or cutting edges of the locking members for providing additional gripping force between the locking insert and the frame member that it is being attached to; and resilient back-off members or springs for backing off the locking members when loosening the screw that forces the locking members apart during disassembly may be used.

One of the advantages of the present invention is to provide greater strength in the locking joint by the uniform pressure being applied over a large surface area, while another advantage is to provide special beveled edges for increasing the gripping and holding force of the joint over that provided by frictional contacts between smooth surfaces.

BRIEF DESCRIPTION OF THE DRAWINGS

Other objects, features and advantages of this invention will be apparent from a study of the written description and the drawings in which.

DESCRIPTION OF THE PREFERRED EMBODIMENTS

Figure 1:
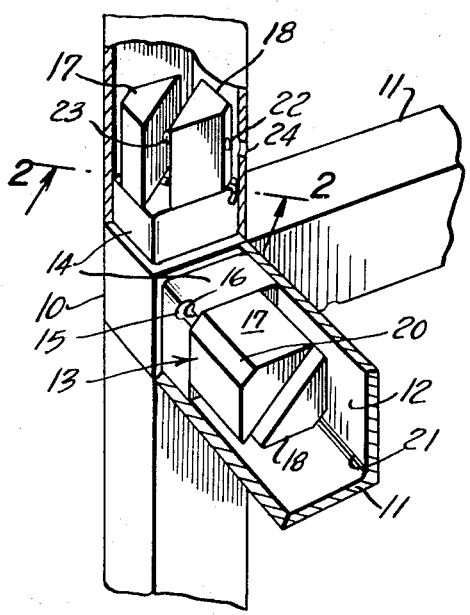
FIG. 1 is a perspective view with parts broken away of a preferred embodiment of the present invention.

FIG. 1 illustrates a typical embodiment of the present invention having a central core 10 connected to four tubular frame members 11 with parts broken away to more clearly illustrate the operation of the locking joint. Frame members 11 have openings 12 therein or may be hollow tube type frame members which may for illustrative purposes be square, as shown; but may also be round in cross section. Structural member 10 has lock joint sections 13 connected thereto for forming a permanent part thereof in which a base 14 has a track or guide 15 running through a cross section of the base 15 and is illustrated as a bulb-shaped groove with narrow mouth 16; a pair of locking members 17 and 18 are illustrated and have slide or slide-bar portions for sliding in trach 15 but which cannot be seen in this view. Slide locking members 17 and 18 are illustrated in this view as being generally triangular shaped so that the pair of them form a generally square shape for fitting within the square cross section of frame member 11. Members 17 and 18 also are shown having the apex of the triangle flattened at 20 which flattened portion 20 allows members 17 and 18 to slid apart from each other and engage the interior surface 12 of frame member 11, without having the apex of the triangle of members 18 and 20 running into the curved portion 21 of the standard tubular frame member 11. Frame member 18 has a hole 22 passing therethrough from the flattened apex to the center of the other side thereof which hole is threaded and may have a screw 23 therein so that upon turning or tightening the screw 23 in its threads in hole 22 it will push against member 17 and separate member 17 and 28 until members 17 and 18 respectively come against the interior walls 12 of frame member 11, thus gripping the interior walls 12 equally over the complete sides of two sides of both members 17 and 18. An aperture 24 located in frame member 11 allows access to the screw 23 located in the threaded hole 22. Aperture 24 would of course in this embodiment be placed at one corner of frame member 11 and preferably an internal corner of the frame so that it would be inconspicuous.

As can be clearly seen at this point, to assemble the joint of the present invention requires slipping the frame member 11 onto the locking insert 13 of structural member 10 by inserting a screwdriver, hollow head set screw wrench, or the like, through aperture 24 into opening 22 and tightening the screw in opening 23 in threaded bore 22 until locking members 17 and 18 have expanded against the interior walls 12 of frame member 11 to engage the walls 12 with sufficient force to lock the member 10 and the member 11 together in a rigid joint. Similarly, to disassemble the joint requires only to insert a screwdriver, or the like, through aperture 24 into hole 22 and loosen screw 23 in order to remove the pressure of members 17 and 18 engaging the interior wall 17 of frame member 11. Frame member 11 may then be easily slipped off. It will, of course, be observed at this point that once the frame member 11 is removed, locking members 17 and 18 are capable of being removed from the locking insert 13 base member 14 by sliding their slide bar out of track 15. If it is desired that they remain attached to the base 14 at all times, this can be accomplished by having the ends of the track 15 blocked such as by a small set screw, or the like.

It should be noted at this point that while a perspective view has been shown illustrating four frame members connected to a central locking unit 10, that the present invention could be utilized with two or more structural members as desired without departing from the spirit and scope of the invention. For instance, one frame member could have one end having a locking insert 13 forming a part thereof for separately attaching two frame members end to end, but at the same time this could be accomplished by having two hollow frame members sliding over a double-ended locking insert 13 and locking both together. Similarly, structural member 10 could have two or three or more locking inserts 13 for attaching frame members as desired. It should also be noted that the guide grooves and the protruding slide bars could be reversed with the grooves located in locking members 17 and 18 and the guide bar in base member 14 without departing from the scope of the invention.

Figure 2:
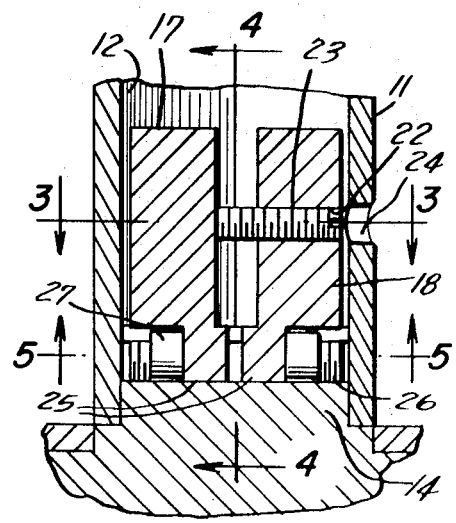
FIG. 2 is a sectional view taken along line 2—2 of FIG. 1.

Referring now to FIG. 2, a cross sectional view can be seen taken along line 2—2 of FIG. 1, and more clearly illustrating screw 32 in threaded hole 22 located in locking member 18 with screw 23 pressing against locking member 17 inside frame member 11. The base 14 can be seen as well as the hollow portion 12 of frame member 11 and aperture 24. As can be more clearly seen from this view, inserting a screwdriver through aperture 24 of frame 11 and tightening screw 23 will separate locking members 17 and 18 until they come against the interior wall 12 of the frame member 11. Slide bars 25 of locking members 17 and 18 can be seen in this view sliding in track 15 and held in place by set screws 26. A resilient material 27 has been placed between setscrews 26 and slide bars 25 so that the separation of members 17 and 18 by tightening screw 23 will compress the resilient material 27. This serves the purpose of allowing easier removal or disassembly of the joint so that when screw 23 is loosened, the resilient material which has been compressed will slide members 17 and 18 away from the interior walls 12 or frame 11 to allow for the east removal of frame member 11. It should be clear, of course, that the invention will work without resilient material 24 and for that matter, without the insert screws 26, but these are added features which improve the overall operation during assemblage and disassemblage of a joint. Resilient material 27 could be rubber, or a foam plastic, or even a spring, if desired.

Figure 3:
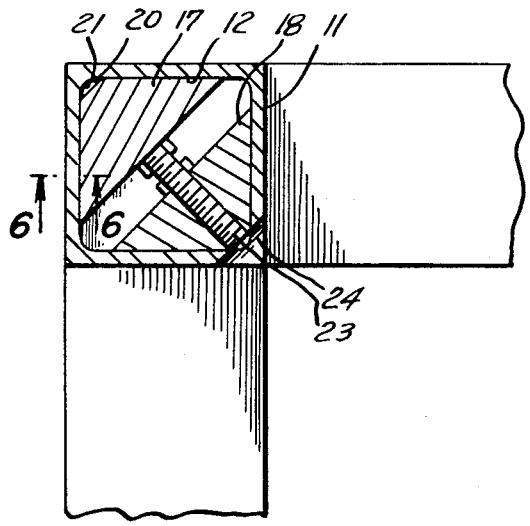
FIG. 3 is a sectional view taken along line 3—3 of FIG. 2.

Turning now to FIG. 3, a top cross sectional view taken along line 3—3 can be seen showing members 17 and 18 engaging the walls 12 of frame member 11 with screw 23 having been tightened to the point to cause a full engagement. Flattened apex 20 can be seen in this view as well as the curved interior portion or corner radius 21 of frame member 11. Aperture 24 can also be seen in this view.

Figure 4:
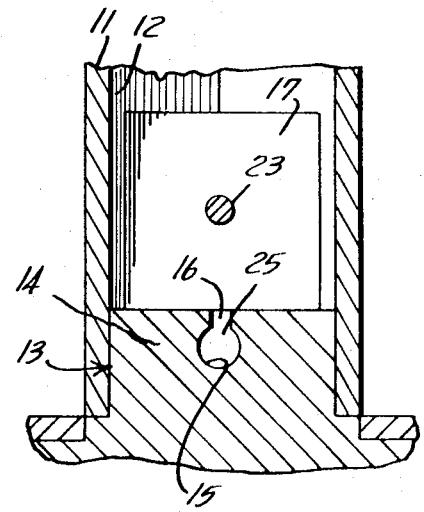
FIG. 4 is a sectional view taken on the line 4—4 of FIG. 2.

FIG. 4 shows a view taken along line 4—4 of FIG. 2, and more clearly shows a track 15 with a narrowed lip 16 for a slide bar 25 to slide in track 15 while holding locking member 17. The locking insert 13 also has base 14 and is insertable in frame 11 hollow portion 12.

It should be observed at this point that while guide 15 is indicated as being bulb-shaped, that is, circular shaped with narrowed opening or neck 16, this guide could also be of other shapes such as a double V bed-type guide or dovetail, or could be square or rectangular shaped as well as the shape illustrated in this figure without departing from the spirit and scope of the invention. A narrowed opening such as 16 would normally be required in order to hold the members 17 and 18 to the base 14.

Figure 5:
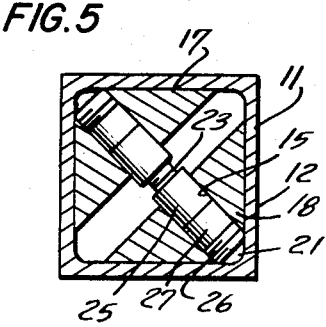
FIG. 5 is a section taken on line 5—5 of FIG. 2.

FIG. 5 is a view taken along line 5—5 of FIG. 2 and illustrates frame member 11 having inside portion 12 with rounded edges 21 and having screw 23 having separated members 17 and 18 gripping the walls 12 of frame member 11. Setscrews 26 may be seen compressing resilient material 27 against slide bars 25 sliding in guide 15 for both members 17 and 18.

Figure 6:
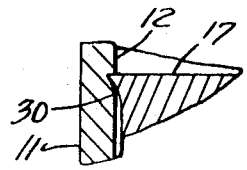
FIG. 6 is a section taken along line 6—6 of FIG. 3, showing a beveled gripping portion of the locking members of the present invention.

FIG. 6 is taken along line 6—6 of FIG. 3 and illustrates how locking member 17 may have a beveled edge 30 to bite into the walls 12 frame member 11 to more firmly grip the walls for a tighter engagement with the walls 12. Such a beveled edge 30 would normally be at the top and bottom of locking member 17 and would of course normally be used with a soft metal, such as an aluminum alloy in which a hardened beveled edge 30 would cut into the metal of frame 11. It is anticipated that beveled edge 30 will enter into the wall 11 to such a point as to provide the remaining portion of the walls of locking member 17 with frictional engagement with wall 11. This may not be necessary in this embodiment. Frame members and other parts of the embodiments shown could be made of aluminum alloy, as well as other materials such as stainless steel, steel, iron, wood or anything else as desired.

It is also anticipated as part of the invention that the engaging walls of locking member 17 could have other and different surfaces to provide greater frictional contact between the walls of locking member 17 and 12 of frame 11.

Figure 7:
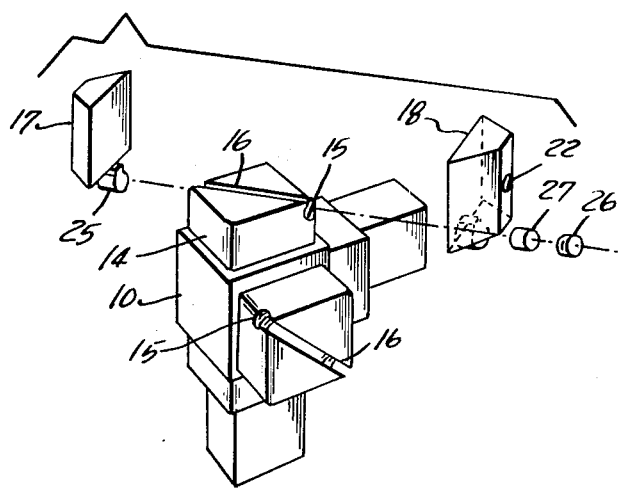
FIG. 7 is an exploded perspective view of the embodiment of FIG. 1.

FIG. 7 illustrates an exploded view in which the means for assembling the structural member 10 can be seen with more clarity and in which members 17 and 18 are shown separated from base 14 and having slide bars 25 protruding from the bottom portion of members 17 and 18 and adapted to slide in track 15 with narrowed lips 16 of base 14 and be locked therein by setscrews 26 having a resilient material 27 between setscrews 26 and slide bars 25. Member 10 has provision for joining four additional frame members thereto.

Figure 8:
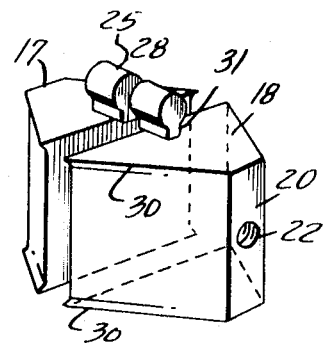
FIG. 8 is a perspective view of the locking members of the embodiment of FIG. 1.

Referring now to FIG. 8, a perspective is shown of locking members 17 and 18 in a position where the slide bars 25 can be more clearly seen protruding from members 17 and 18 with narrowed portions 31 for a uniform fit into tracks 15. Locking member 18 can be seen as having a bore or hole 22 entering from the flattened apex 20 and which passes through locking member 18. Locking members 17 and 18 can be seen having the beveled or cutting edges 30 at the top and bottom thereof for engaging the internal or inside walls of a tubular structure member.

Figure 9:
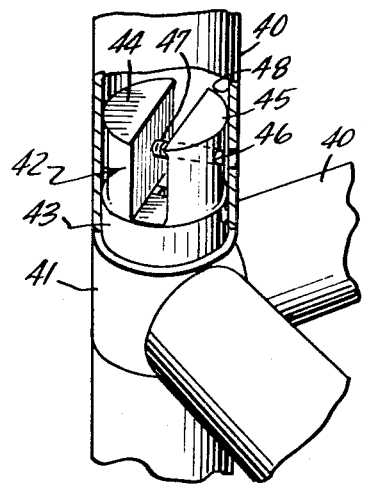
FIG. 9 is a perspective view of a second embodiment of the present invention.

FIG. 9 illustrates yet another embodiment of the present invention in which tubular-shaped frame members 40, having a generally circular cross section are used rather than frame members with square or rectangular cross sections in which frame members 40 could be various types of tubes or pipes commercially available and locking corner joint 41 has locking inserts 42 having a base 43 which is generally cylindrical in shape and having semicylindrical shape locking members 44 and 45, with locking member 45 having a bore 46 which has been threaded for a screw 47 which may be tightened to separate members 44 and 45 for engagement with the internal walls 48 of tube member 40. This embodiment illustrates that the shape of the locking insert and of the frame members can vary as desired for the particular piece and shape of structure being assembled. It should, for instance, be clear that frame member 40 could not only be circular in cross sections such as tube, but could also be oval or could be a panel, such as the side of a piece of furniture, or the like.

Figure 10:
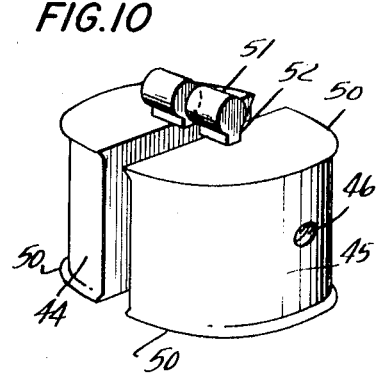
FIG. 10 is a perspective view of the locking members of the embodiment of FIG. 9.

Turning now to FIG. 10, there is a perspective view of the locking members 44 and 45 of the embodiment of FIG. 9 which view is similar to the view of FIG. 8, and illustrates the semicylindrical shape of locking members 44 and 45 with the threaded bore 46 passing through locking member 45. Locking members 44 and 45 are illustrated as having upper and lower beveled edges 50 for engaging the internal walls of the frame member to which it is to be connected and also having sliding bars 51 with narrowed portions 52 for fitting into the tracks of the base of the locking insert.

It will be clear at this point that a locking joint has been provided which is especially adaptable for use in modular construction for easy assemblage and disassemblage of furniture frames, and the like, but it should be clear that it is anticipated that other uses are anticipated for the present invention. For instance, it has been suggested that the frame members as illustrated in the present disclosure could be panel members of the sides of furniture, or the like, rather than tubular frames and could be designed for easy concealment of the joint or means while providing for quick disassemblage for movement or shipment and then reassemblage. The present joint could also be utilized in knowndown work benches, assembly benches, room dividers, maintain scaffolding, display cases and any other frame structure. Accordingly this invention is not to be construed as limited to the particular forms disclosed herein, since these are to be regarded as illustrative rather than restrictive.

I claim:

1. A joint locking apparatus for connecting a plurality of frame or structure members together comprising in combination:

a. at least one first frame member being elongated and having at least one open end;
   b. at least one second frame member having locking insert means forming a part thereof;
   c. each said first frame member being adapted to receive at least one said locking insert means of at least one second frame member in one said open end of said first frame member;
   d. said locking insert means having a base member and locking members slidably attached to one end of said base member; each said locking member being slidably connected to the end of said base member by a guide and guide bar means whereby a guide bar slides in a guide groove, said guide and guide bar means connecting said locking members to said base for transverse sliding of each said locking member relative to said elongated first frame member; and
   e. means to slide each said locking member transversely into engagement with the internal walls of said first frame member thereby connecting said first and second frame members together.

2. The apparatus according to claim 1 in which said means to slide said locking members apart includes a screw threaded through one said locking member and adapted to apply a force to the other said locking member when tightened.

3. The apparatus according to claim 2 in which each said second frame member has at least one aperture therein for access to said screw threaded through said one locking member.

4. The apparatus according to claim 3 in which each said locking member has gripping surfaces for gripping the internal walls of each first frame member being joined to a second frame member.

5. The apparatus according to claim 4 in which said locking insert means base member has said guide groove therein and said guide bars are located on each said locking member.

6. The apparatus according to claim 5 in which said guide means of said base member has stop means on each end thereof to maintain said guide bars of said locking members in said guide groove.

7. The apparatus according to claim 6 in which said guide groove has resilient means therein adapted to force said guide bars toward each other in said guide means.

8. The apparatus according to claim 7 in which each said locking member is substantially triangular is cross sectioned with a flattened apex.

9. The apparatus according to claim 7 in which each said locking member is substantially semicylindrically shaped.

10. The apparatus according to claim 7 in which each said guide groove is bulb shaped.

11. The apparatus according to claim 10 in which said guide bars are bulb-shaped protusions for sliding in said bulb-shaped guide groove.

12. The apparatus according to claim 11 in which said second frame member is a hollow tube.

13. The apparatus according to claim 12 in which said hollow tube is substantially square in cross sections.

* * * * *